Sept. 29, 1936.   F. L. SHELOR   2,055,950
VACUUM CONTROLLED BRAKING MECHANISM FOR MOTOR OPERATED VEHICLES
Original Filed May 13, 1932   5 Sheets-Sheet 1
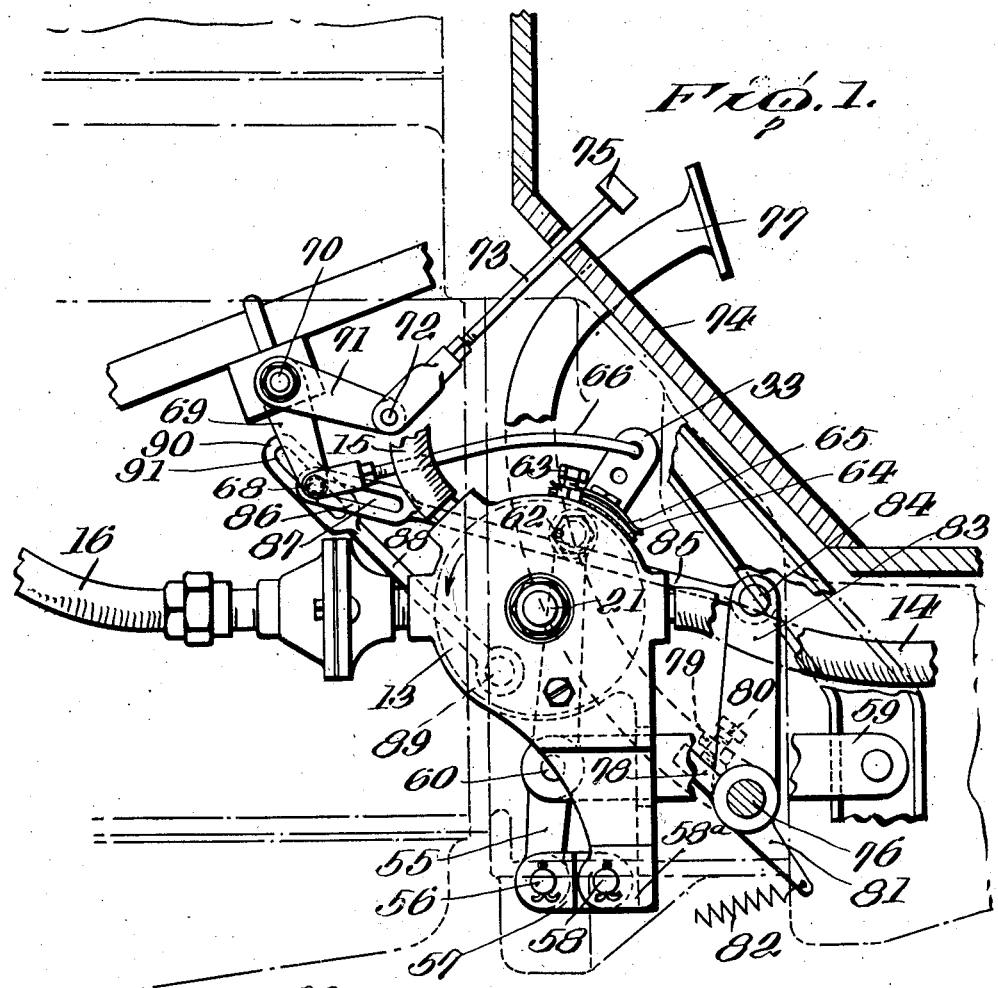
Inventor
F. L. Shelor
Attorneys

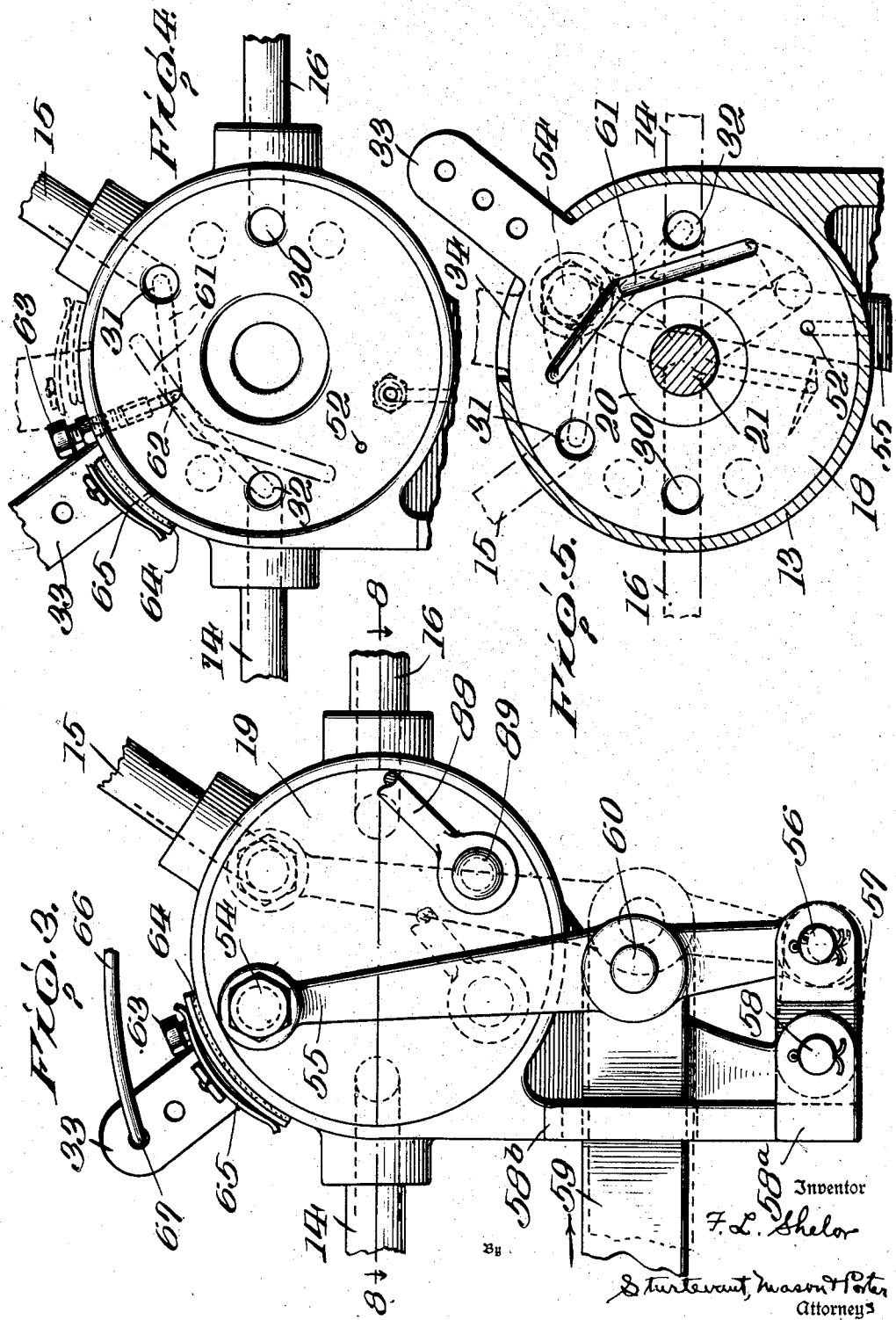

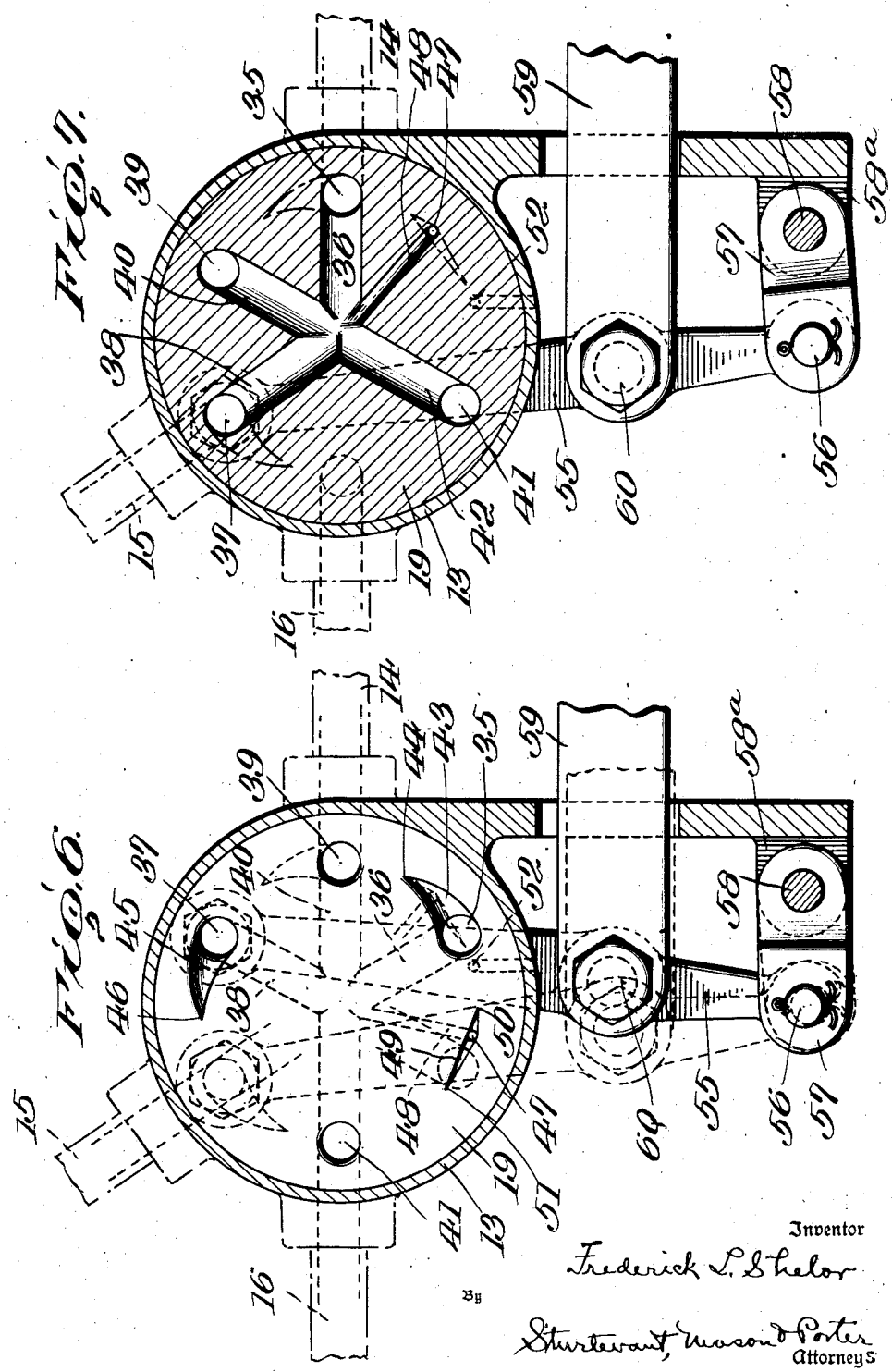

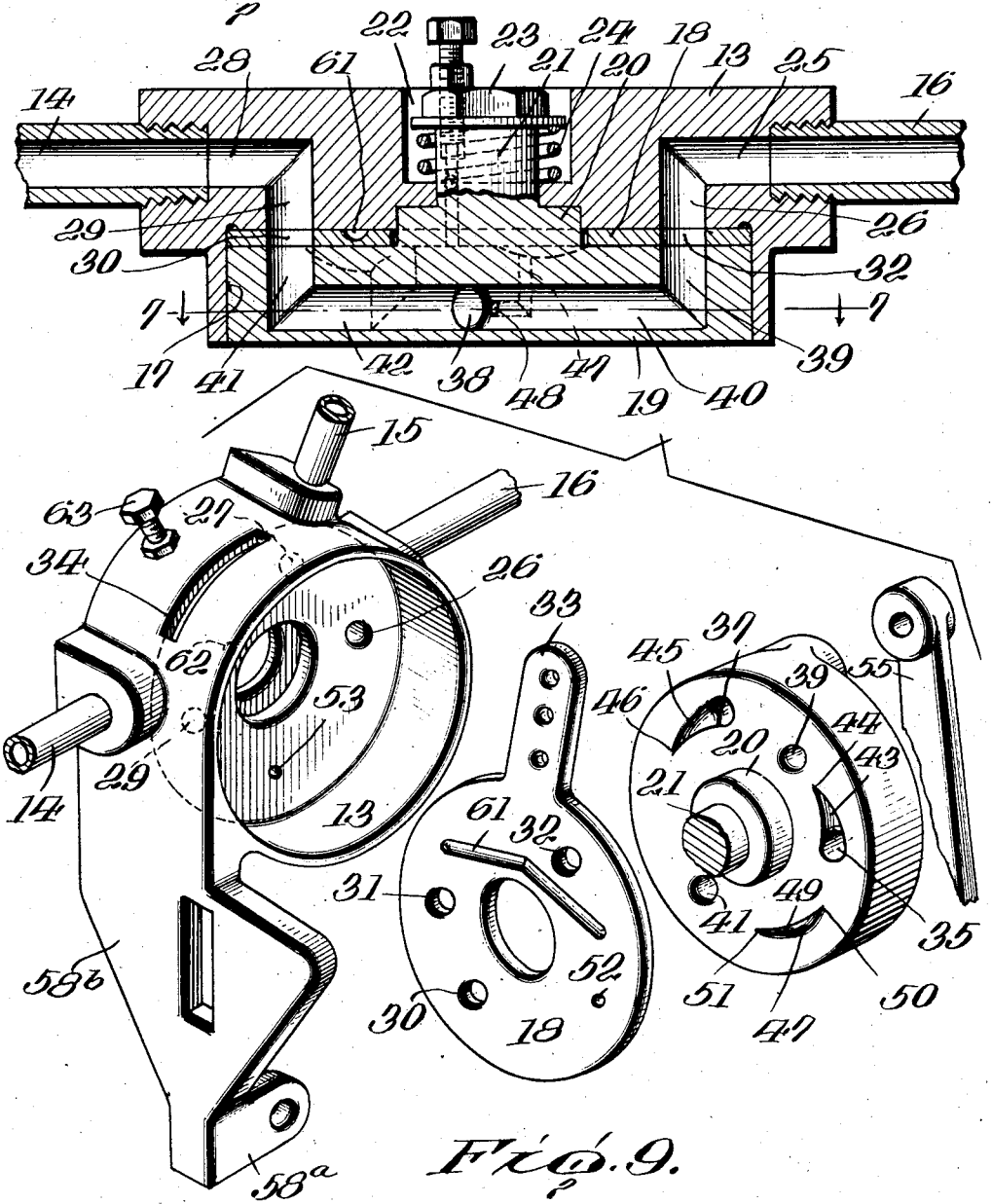

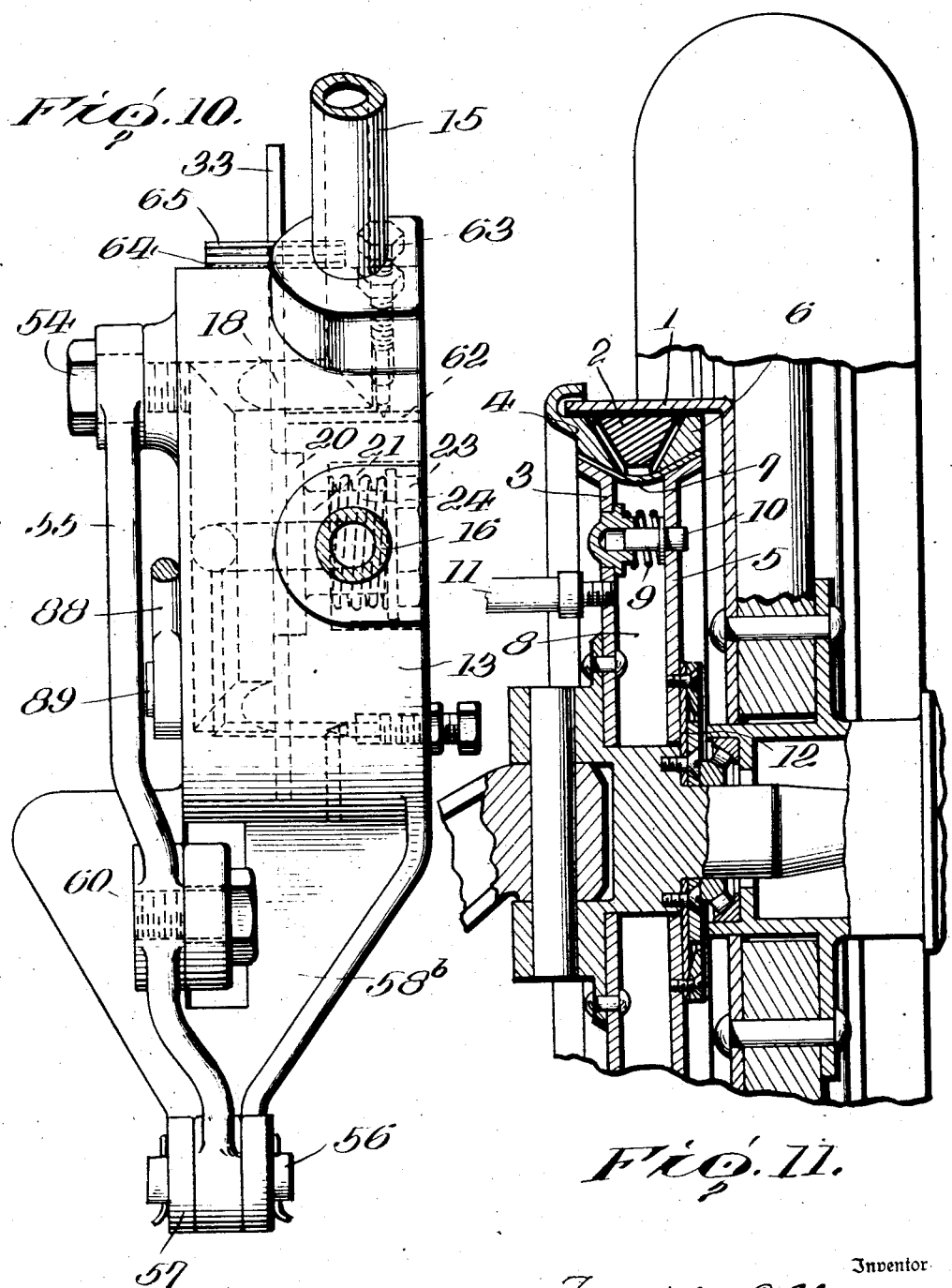

Patented Sept. 29, 1936

2,055,950

UNITED STATES PATENT OFFICE 2,055,950

VACUUM CONTROLLED BRAKING MECHANISM FOR MOTOR OPERATED VEHICLES

Frederick L. Shelor, Richmond, Va., assignor to Innovation Brakes, Inc., Richmond, Va., a corporation of Virginia Application May 13, 1932, Serial No. 611,205
Renewed February 19, 1936

13 Claims. (Cl. 192—13)

The invention relates to new and useful improvements in a braking mechanism for motor operated vehicles, and more particularly to a braking mechanism which is vacuum controlled.

An object of the invention is to provide a braking mechanism which is manually controlled and which may be applied for retarding or stopping the motor vehicle, and wherein a predetermined braking pressure is retained after the manual control is released.

A further object of the invention is to provide a braking mechanism of the above type with means whereby the braking pressure is released when the clutch is closed.

A still further object of the invention is to provide a braking mechanism of the above type having a separate manual control from the manual control of the main braking mechanism, and which is released when the main braking mechanism is applied.

A still further object of the invention is to provide a braking mechanism of the above type wherein the brakes are applied by a differential pressure created by producing a vacuum on a chamber, and wherein the degree of vacuum is controlled by a valve mechanism so constructed that through the shifting of a control member thereof, a predetermined degree of vacuum and brake pressure may be produced and maintained.

A still further object of the invention is to provide a braking mechanism of the above type wherein the control member of the valve mechanism is retained in a set position when released by the operator and which is returned to normal position for releasing the brakes when the clutch is closed.

These and other objects will in part be obvious and will in part be hereinafter more fully disclosed.

In the drawings which show by way of illustration one embodiment of the invention—

Figure 1 is a view in vertical section, and showing more or less diagrammatically a portion of a motor vehicle with the improved braking mechanism applied thereto, the parts being in position so that the brakes are released;

Fig. 2 is a view of certain of the parts shown in Fig. 1, with the control valve for the auxiliary braking mechanism shifted to a position for applying the brakes;

Fig. 3 is an enlarged view showing the control valve for the braking system and the means for operating the same from the usual brake pedal;

Fig. 4 is a view similar to Fig. 3, but showing the main control disk removed and the auxiliary control disk in face view, with the disk as shown in full lines set for releasing the brakes, and in dotted lines for applying the auxiliary braking pressure;

Fig. 5 is a sectional view through the valve casing showing the auxiliary control disk viewed from the opposite side from that shown in Fig. 4, and in full lines with the disk set for releasing the brakes and in broken lines with the disk set for applying the brakes;

Fig. 6 is a sectional view through the valve viewed from the opposite side from that shown in Fig. 3, and showing the main control disk in face view, and in the full line position with the disk set for releasing the brake, and in the dotted line position with the disk set for applying the brake;

Fig. 7 is a sectional view through the control valve on the line 7—7 of Fig. 8, and with the valve set for applying the brakes;

Fig. 8 is a sectional view on the line 8—8 of Fig. 3;

Fig. 9 is a perspective view of the valve with the control disk therefor separated from the casing;

Fig. 10 is an edge view of the valve casing showing the control lever for shifting the main disk;

Fig. 11 is a sectional view through a portion of one of the wheels showing a form of braking means therefor.

The invention is directed to a braking mechanism for a motor vehicle, and includes a main braking mechanism for applying a brake pressure to the wheels and also an auxiliary braking mechanism for applying a retarding or stopping brake pressure to the vehicle. While there are new features in the main braking mechanism, the invention is directed particularly to the auxiliary braking mechanism. The auxiliary braking mechanism is manually controlled independently of the control of the main braking mechanism, and includes devices whereby a braking pressure is applied for retarding the movement of the motor vehicle for stopping the same and for holding the same in a set position, which manual control for the auxiliary braking mechanism may be released by the operator and the braking pressure retained. This is preferably accomplished by a vacuum control brake pressure and a control valve including a shiftable member which is normally set so that the braking pressure is released, and which, when shifted manually, will cause a braking pressure to be developed to a certain predetermined degree and retained at this predetermined degree, even though the shifting mechanism is released by the operator. Means is also provided whereby when the clutch is closed, the disk is returned to normal position for releasing the brake pressure. There is also means provided for shifting the control member when the main pedal is depressed for applying the main brakes.

It is thought that the invention will be better understood by a detail description of the illustrated embodiment thereof. The main braking mechanism will be first described, after which the auxiliary braking mechanism will be described in detail.

As illustrated, there is at each wheel of the motor vehicle, a braking means which includes a drum 1 attached to and turning with the wheel. Mounted on the inner face of the drum for movement axially of the wheel is an annular member 2 having at each side thereof braking surfaces. Within the drum is a disk 3 which is fixed to the axle housing and is held from movement. Attached to this disk is a brake shoe 4. This brake shoe 4 is adapted to engage the outer face of the member 2. Also within the drum is a disk 5 carrying a brake shoe 6. Attached to the disks 3 and 5 is a flexible member 7 which extends all the way around the disks and forms a closed chamber 8 between the disks. A spring 9 normally separates the disks, and pins 10 hold the disks from angular movement relative to each other about the axis of the wheel. A pipe 11 is connected to the disk 3 and leads therethrough for placing the chamber 8 under a pressure differing from the atmospheric pressure bearing on the disks. This pipe 11 is preferably connected to a suitable source for creating a vacuum so that the chamber is placed under vacuum, and when it is placed under vacuum, the atmospheric pressure on the disk 5 will force the disk axially of the wheel, bringing the brake shoe 6 into contact with the member 2 and moving the member 2 axially on the drum into contact with the member 4. There is a flexible member 12 connected to the disk 5 adjacent the hub which permits this disk 5 to move axially of the wheel. This specific braking means forms no part of the present invention, but is shown, described and claimed in my co-pending application Serial No. 572,705, filed November 2, 1931.

The suction on the chamber 8 producing a vacuum therein, is controlled by a valve mechanism which includes a control disk shifted by the usual brake pedal. The shiftable disk is mounted in a casing 13 attached to a suitable bracket mounted in the frame of the motor vehicle. Leading from the casing is a pipe 14 which is connected to a suitable header. The pipes 11 leading from each wheel are connected to this header. Also leading from the casing is a pipe 15 which is connected to the intake manifold of the engine. There is a third pipe leading from the casing 13 indicated at 16 which is connected in any suitable way to the atmosphere, but said pipe is preferably connected to the exhaust manifold which is under slight pressure, and which deadens any noise incident to the releasing of the brakes.

In the casing is a shiftable valve member for connecting the chambers at each braking means in the wheels with the intake manifold. This shiftable member also connects the chambers in each braking means with the atmosphere for releasing the brakes. In my co-pending application Serial No. 597,358, filed March 7, 1932, there is shown, described and claimed broadly, a control mechanism for a braking system embodying the principles of the present invention and the present valve mechanism so far as applied to the main braking mechanism is an improvement on the control mechanism shown in said application.

The casing is provided with a recess 17 which is open at one side of the casing. Located in this recess are two control disks, an auxiliary control disk 18 used in connection with the auxiliary braking mechanism which is to be described later, and a main control disk 19 which is used in connection with the main braking mechanism that is now being described. The main control disk 19 is provided with a hub 20 from which projects a stub shaft 21, and this hub and stub shaft are mounted for rotation in the valve casing 13. The casing is provided with a recess 22 in the opposite face thereof, and the stub shaft 21 extends into this recess. On the end of the stub shaft is a nut 23, and between the nut and the inner wall of the recess is a tension spring 24. This tension spring serves to hold the disks tightly seated against each other and against the inner wall of the recess 17. The pipe 16 leads to a right angle port 25 which opens at 26 in the face of the recess 17 against which the disk 18 seats. The pipe 15 is connected to a similar right angle port which opens at 27 in said face. The pipe 14 is connected to an angular port 28 which opens at 29 in the face of the recess. The disk 18 is provided with openings 30, 31 and 32 which may be moved into register with the openings 26, 27 and 29, respectively. The disk 19 is provided with an arm 33 which projects through a slot 34 in the valve casing. When the disk is in the full line position shown in Fig. 4, then the openings 30, 31, and 32 are in register with the openings 26, 27, and 29, respectively. This is the off or release position for the control disk 18, and in this set position, it does not in any way affect the control of the main braking mechanism by the shifting of the main control disk 19. The main control disk 19 is provided with an opening 35 extending axially into the disk, part way through the disk, and connecting to a radial port 36. It is also provided with an opening 37 of a similar character connecting to a radial port 38. The disk is also provided with an opening 39 extending axially into the disk and connecting with the radial port 40. It is likewise provided with a similar opening 41 connecting with a radial port 42. The radial ports 36, 38, 40, and 42 are all connected at the center of the disk. The inner face of the disk 19 adjacent the opening 35 is formed with a recess 43 which is shaped so as to vanish at the point 44. There is a similar recess 45 associated with the opening 37 vanishing at the point 46.

There is a relatively small opening 47 extending axially of the disk 19 and connected to a radial port 48 which is likewise connected to the ports 36, 38, 40, and 42. There is a recess 49 in the inner face of the disk 19 which extends to each side of the opening 47, and is shaped so as to vanish on the one side at the point 50 and on the other side at the point 51. There is an opening 52 in the disk 18 and an opening 53 in the casing, which opening 53 leads to the atmosphere. This opening leading to the atmosphere may, if desired, be controlled by any suitable adjustable means. When the openings 30, 31, and 32 are in register with the openings 26, 27, and 29, respectively, the opening 52 is likewise in register with the opening 53. This is when the disk 18 is in its off or released position for the auxiliary braking mechanism, so that the disk does not in any way interfere with the control of the main braking mechanism by the shiftable disk 19.

The disk 19 carries a stud bolt 54 to which a lever 55 is connected. The lever 55 is pivoted at 56 to a link 57 which in turn is pivoted at 58 to a lug 58ª carried by the bracket 58ᵇ supporting the casing. A link 59 is pivoted at 60 to the lever 55 and this link 59 is connected to the usual brake pedal so that when the brake pedal is depressed, the link will be forced in the direction of the arrow (Fig. 3), and will shift the disk 19 from one set position to another, as indicated in broken lines. It will be understood that the disk is shifted an extent depending upon the extent of depression of the pedal. When the pedal is released, the disk 19 is in the full line position as shown in Fig. 3, and this is also the full line position shown in Fig. 6. At this time, the openings 38 and 41 are in register with the openings 32 and 30, respectively, in the disk 18, and with the openings 26 and 29, respectively, in the valve casing. The pipe 14 is, therefore, directly connected through these openings and the radial ports 40 and 42, with the atmosphere and the brakes are released. When the control disk 19 is turned in a counter clockwise direction, as viewed in Fig. 6, the openings 38 and 41 are moved out of register with the openings 30 and 32, respectively, and thus the vacuum chambers in each braking means is cut off from its connection to the atmosphere and is closed. A continued movement of the disk 19 will bring the recess 43 into connection with the openings 32 in the disk 18 and the opening 29 in the valve casing which leads to the pipe 14 and to the brake chambers. At the same time the recess 45 will be brought into register with the opening 31 in the disk 18 and the opening 27 in the valve casing which leads to the pipe 15 connected with the intake manifold of the engine. This establishes a direct connection between the intake manifold and the chamber at each braking means. The opening will be at first very gradual, and this will increase as the disk is shifted, and finally the opening will be to the full extent as shown in Fig. 7.

After the recesses 43 and 45 have been brought into engagement with the pipes leading, respectively, to the brake chambers and the intake manifold, and the port opened to a slight extent, then the recess 49 will be brought into register with the opening 52 and the opening 53 leading to the atmosphere. This will gradually open the chamber within the valve to the atmosphere. The purpose of this opening of the chamber to the atmosphere is to maintain the vacuum pressure at various predetermined degrees, depending upon the depressing of the pedal; for example, if the pedal is depressed so as to shift the control disk 19 so as to provide a partial opening of the ports, the brake pressure will develop to say six inches, and will be maintained at this brake pressure, by reason of the fact that the chamber in the valve through which the vacuum on the brake chambers is drawn, is vented to the atmosphere, and a certain amount of atmospheric air passes in through this opening 47 into this chamber formed by the radial ports 36, 38 and 48. A further depressing of the pedal increases the opening of the port leading to the intake manifold, and also varies the opening leading to the atmosphere, so that for greater vacuum pressure, the pressure may be retained at a predetermined desired pressure below that of the pressure of the intake manifold. This is accomplished merely by moving the pedal to a certain predetermined point and holding it at this point. This maintaining of the vacuum pressure at a predetermined degree below that of the pressure on the intake manifold, is fully described in detail in my co-pending application Serial No. 597,358, and further description thereof is not thought necessary.

The present control means is simpler in construction than that of my prior application, as it is in the form of a rotating control disk instead of a right line sliding control member. The principle of operation, however, is the same.

An auxiliary braking mechanism has been provided which is controlled by the disk 18. In the present illustrated embodiment of the invention, the braking means at the wheels is used for applying brake pressure, but the control of the brake pressure is through the auxiliary disk 18 and not in any way is the pressure controlled by the disk 19. The disk 19 remains in its off position. The disk 18 is provided on the face thereof adjacent the inner face of the recess 17 with a groove 61. The groove does not extend through the disk, but merely along the inner face thereof. There is also an opening 62 in the valve casing leading from the inner face of the recess to the atmosphere, and the size of this opening is controlled by an adjusting screw 63. When the disk is in the full line position as shown in Figures 4 and 5, then the auxiliary braking mechanism is released. At this time, the openings 32 and 30 are in register with the openings 29 and 26, respectively, and the chamber at each braking means is connected with the atmosphere. The groove 61 is also out of register with any of the openings. When the disk is shifted to the broken line position, then the openings 32 and 30 are moved out of register with the openings 29 and 26, thus closing the connection of the chamber at each braking means to the atmosphere. A continued movement of the disk 18 will bring the groove 61 into register with the opening 29 connected with the pipe 14 leading to the chamber at each braking means, and the opening 27 connected with the pipe 15 leading to the manifold. The size of the groove 61 is preferably such that the maximum brake pressure applied to the wheels is less than the vacuum pressure on the intake manifold, and whatever the pressure selected may be, it can be varied slightly by adjustment of the size of the port leading to the atmosphere through the adjustment of the control screw 63. Let us assume that a brake pressure of ten inches is desired when the auxiliary disk is shifted. The adjusting screw 63 is set so as to regulate the opening to the atmosphere, and the amount of air which will be drawn in through the vacuum pull of the intake manifold. A shifting of the disk will connect the chambers at the braking means in each wheel with the intake manifold, and the air from the chambers will be gradually exhausted, thus gradually creating a differential pressure up to the maximum pull of the intake manifold on the set adjustment of the screw 63. If this is for ten inches, it will remain at the ten inches, and will not increase above this pressure, although the disk remains in its set open position. This provides a means whereby the brakes may be gradually applied by the shifting of the disk 18 and as long as the disk is held in its shifted position, there will be a constant brakage pressure applied to the wheels, which may be sufficient to retard the vehicle, finally stopping the same, or to hold the vehicle in a fixed position on a grade, if desired. When the disk is returned to normal off position, then the openings 32 and 30 are brought into register with the openings 29 and 26, thus connecting the chambers at the braking means with the atmosphere and releasing the brakes.

The control disk 18 is provided with a spring tension means for holding the same in different set positions. As shown, this means includes a brake shoe 64 which is yieldingly pressed against the outer face of the valve casing by a leaf spring 65. This, as noted, serves as a means for holding the disk in a set position until sufficient pressure is applied to overcome the resistance and shift the disk. The control disk 18 is shifted by means of a link 66 which may be connected to the opening 67 in the arm 33, or one of the other openings in the arm. This link 66, as shown in Fig. 1, is pivoted at 68 to an arm 69 carried by a shaft 70. The shaft 70 carries an arm 71 which is pivoted at 72 to a rod 73 extending through the floor board 74 of the vehicle, and carrying a button 75 at its upper end. When the foot of the operator is placed on the button 75 and the rod 73 depressed, it will turn the shaft 70 in a clockwise direction, and this will move the disk to the dotted line position for applying the auxiliary braking pressure to the wheels. If the foot of the operator is removed from the button, the disk will stay in its set position, and therefore, the operator may depress the button, applying the auxiliary braking pressure to the wheels, and then release the button, and the brake pressure will be maintained on the wheels until the control disk 18 is shifted back to its normal off position. There are two ways shown of shifting the disk to off position. One is through the control of the clutch, so that when the clutch is thrown into engagement, the brake will be released, and the other is through the brake pedal controlling the main braking mechanism.

The clutch mechanism is controlled by a shaft 76. The clutch mechanism is of the usual character, and is preferably of the type whereby the depression of the accelerator lever will close the clutch and the release of the accelerator lever will open the clutch. There is a clutch pedal 77 which is loosely connected to the shaft 76. As herein shown, it is mounted on the shaft and has a free movement thereon. There is an arm 78 fixed to the shaft 76. There is a lug 79 projecting from the pedal arm and a screw 80 carried by the lug is adapted to contact with the arm 78. When the pedal is depressed it will cause the clutch shaft to be turned and the clutch released, but the clutch shaft may be turned by the accelerator lever without depressing the pedal 77. The pedal 77 has a projecting arm 81 to which a spring 82 is attached and which operates to normally hold the pedal in its raised position.

As a means for shifting the control disk 18 to normal or off position, I have provided the clutch shaft 76 with an arm 83 which is fixed to the shaft. This arm is pivoted at 84 to a link 85. The link has a head 86 with a slot 87 therein. This slot straddles a pin carried by the arm 69. When the clutch shaft is turned for releasing the clutch, the link 85 will move freely without disturbing the disk 18. The end of the slot 87 will move away from the pin in the arm 69. After the clutch is thrown out, then the operator may depress the rod 73 and shift the control disk 18 so as to apply the auxiliary brake pressure for retarding the movement of the vehicle. If the rod 73 is released, still the control disk will remain in its set position. When, however, the clutch is thrown in, then the arm 83 will be turned in a clockwise direction, and this, through the link 85 will shift the arm 69 in a counter clockwise direction and force the disk 18 back to its normal or cut off position.

In order that the control disk 18 may be returned to normal position when the main brake pedal is depressed, I have provided a link 88 which is pivoted at 89 to the control disk 19. This link 88 has a head portion 90 provided with a slot 91 which engages a pin on the arm 69. When the control disk 19 is in normal cut off position, the pin on the arm 69 is at the inner end of the slot as shown in Fig. 1. When, however, the control disk 18 has been shifted, then the pin on the arm 69 is moved to the end of the slot in the link 88. When the brake pedal is depressed, the auxiliary disk 19 is turned in the direction of the arrow in Fig. 1, and this will pull on the link 88 and thus return the auxiliary disk 18 to its normal cut off position.

The operation of the main braking mechanism controlled by the control disk 19 is thought to be obvious from the description which has been given. The auxiliary braking mechanism is used for retarding the forward movement of the vehicle, and for stopping and for holding the vehicle in a stopped position on a grade. When it is desired to retard the vehicle, owing to the approaching of a curve, and particularly in a type of drive where there is free-wheeling, the operator places the foot on the button 75 and depresses the rod 73. This will shift the auxiliary control disk to operative position, and gradually the brake pressure will build up to the maximum for which the adjustable screw is set, say ten inches. The brake is gradually applied so that there is no sudden jerking incident to the application of the auxiliary braking mechanism. The ten inches brake pressure will stop the vehicle in a short distance and can be relied upon to hold the vehicle on an ordinary grade. If, for any reason it is desired to stop on up-grade, this can be accomplished by pressing on the button 75. The vehicle stops, the operator can release the button, but the brakes remain in their set position, holding the vehicle.

Then again, if the operator depresses the rod 73 to retard the movement of the vehicle, and then finds it is necessary to stop very quickly, all the operator has to do is to put the foot at once on the brake pedal and depress the brake pedal, which will shift the control disk 19 and apply the full brake pressure which can be obtained from the intake manifold. The auxiliary brake pressure is not released, but the full brake pressure is added thereto. In other words, if the auxiliary brake pressure is set at ten inches, then the depressing of the treadle control in the main brake pressure will add to the ten inches brake pressure of the auxiliary brake, increasing the brake pressure on the wheels to the full brake pressure that can be obtained from the manifold.

It will be noted that the link 11 is attached to the main control disk 19 at a point much nearer the center of rotation of the disks than the connection of the link 66 to the arm attached to the auxiliary disk. The auxiliary disk turns through an angle of approximately thirty degrees. The main disk turns through an angle of approximately sixty degrees. The rotation of the main disk by a depressing of the treadle will operate through the link 88 to shift the auxiliary disk back to normal position. In other words, the difference in the leverages of the connections to the main disk and the auxiliary disk will cause the main disk when turned through an angle of sixty degrees to turn the auxiliary disk only through an angle of thirty degrees. When the auxiliary disk is turned back to normal position through the depressing of the treadle which shifts the main control disk, the openings 30 and 32 will begin to register with the openings 29 and 26, respectively, after the openings 41 and 38 have moved out of register, and this will prevent the connecting of the chambers in the braking means with the atmosphere. It will also establish a connection through the openings 30 and 31 with the openings 26 and 27, thus permitting the intake manifold to be connected to the chambers in the braking means, so far as the setting of the auxiliary disk is concerned. Meanwhile, the main control disk is shifted by the treadle so that the recesses 43 and 46 begin to brake or connect with the openings 30 and 31, and thence with the openings 26 and 27, and this actually establishes a connection between the intake manifold and the brake chambers. A continued depressing of the treadle will increase the brake pressure as it opens the ports in precisely the same manner as described in connection with the control of the main braking means.

From the above it will be apparent that the auxiliary braking means has been provided for retarding the movement of the vehicle and for stopping the same under a limited brake pressure, and at the same time, the main braking means may be at any time applied without releasing this auxiliary brake pressure for quickly stopping the vehicle.

While the angles of movements of the main disk and the auxiliary disk have been referred to, it is understood that this is solely for the purpose of illustration, and that these angles may be varied relative to each other.

From the above description it will be apparent that an efficient braking means has been provided which may be controlled by the vacuum pressure of the intake manifold, and this vacuum pressure can be modified and maintained at a desired pressure for applying the brakes gradually and to varying degrees. An auxiliary braking mechanism has also been provided which may be operated by the vacuum pressure of the intake manifold, which auxiliary braking means is so constructed that it is manually controlled and the manual control means may be released while the braking pressure is maintained. At the same time when the clutch is thrown in, this auxiliary braking mechanism is automatically released, or when the pedal is depressed for utilizing the main braking mechanism, the auxiliary braking mechanism is likewise automatically released.

It is obvious that many changes in the details of construction and the arrangement of the parts may be made without departing from the spirit of the invention as set forth in the appended claims.

Having thus described the invention, what I claim as new and desire to secure by Letters Patent, is—

1. A motor vehicle comprising in combination a vacuum controlled braking mechanism including braking means having a chamber in which a vacuum may be created, said chamber having a movable member for operating the braking means, a manually controlled valve mechanism interposed between the chamber and a vacuum creating means, said valve mechanism including a main rotatable control disk provided with means whereby the degree of vacuum produced on said chamber may be varied by shifting said control disk, an auxiliary control disk shiftable independently of the main control disk and provided with means for determining and maintaining a predetermined degree of vacuum on the chamber, and independent manually controlled means for each control disk.

2. A motor vehicle comprising in combination a vacuum controlled braking mechanism including braking means having a chamber in which a vacuum may be created, said chamber having a movable member for operating the braking means, a manually controlled valve mechanism interposed between the chamber and a vacuum creating means, said valve mechanism including a main rotatable control disk provided with means whereby the degree of vacuum produced on said chamber may be varied by shifting said control disk, an auxiliary control disk shiftable independently of the main control disk and provided with means for determining and maintaining a predetermined degree of vacuum on the chamber, and independent manually controlled means for each control disk, said valve mechanism having means for retaining said auxiliary disk in a shifted position with a vacuum on the chamber when the manually controlled means therefor is released.

3. A motor vehicle comprising in combination a vacuum controlled braking mechanism including braking means having a chamber in which a vacuum may be created, said chamber having a movable member for operating the braking means, a manually controlled valve mechanism interposed between the chamber and a vacuum creating means, said valve mechanism including a main rotatable control disk provided with means whereby the degree of vacuum produced on said chamber may be varied by shifting said control disk, an auxiliary control disk shiftable independently of the main control disk and provided with means for determining and maintaining a predetermined degree of vacuum on the chamber, independent manually controlled means for each control disk, said valve mechanism having means for retaining said auxiliary disk in a shifted position with a vacuum on the chamber when the manually controlled means therefor is released, and means operated by the manually controlled means for the main control disk for shifting said auxiliary disk to normal position when said manually controlled means is operated for shifting the main control disk for applying the braking means.

4. A motor vehicle comprising in combination a vacuum controlled braking mechanism including braking means having a chamber in which a vacuum may be created, said chamber having a movable member for operating the braking means, a manually controlled valve mechanism interposed between the chamber and a vacuum creating means, said valve mechanism including a rotatable control disk provided with means for determining the degree of vaccum in the chamber, manually controlled means for shifting said disk, and means for retaining said control disk in a shifted position when the manually controlled means therefor is released.

5. A motor vehicle comprising in combination a vacuum controlled braking mechanism including braking means having a chamber in which a vacuum may be created, said chamber having a movable member for operating the braking means, a manually controlled valve mechanism interposed between the chamber and a vacuum creating means, said valve mechanism including a rotatable control disk provided with means for determining the degree of vacuum on the chamber, manually controlled means for shifting said disk, a power transmission mechanism including means for applying and releasing a driving clutch, and means operating automatically upon the applying of the clutch for shifting the control disk to release the braking means.

6. A motor vehicle comprising in combination a vacuum controlled braking mechanism including braking means having a chamber in which a vacuum may be created, said chamber having a movable member for operating the braking means, a manually controlled valve mechanism interposed between the chamber and a vacuum creating means, said valve mechanism including a rotatable control disk provided with means for determining the degree of vacuum on the chamber, manually controlled means for shifting said disk, a power transmitting mechanism including means for applying and releasing a driving clutch, a link connecting said manually controlled means for shifting the disk with the clutch applying means, said link having a slotted connection with the control means for the disk whereby said clutch can be applied and released without disturbing the position of the control disk and whereby when said disk has been shifted to apply the braking mechanism, said link will return the disk to normal position to release the braking mechanism upon the applying of the clutch.

7. A motor vehicle comprising in combination a vacuum controlled braking mechanism including braking means having a chamber in which a vacuum may be created, said chamber having a movable member for operating the braking means, a valve mechanism interposed between the chamber and a vacuum creating means, said valve mechanism including a shiftable member providing means for determining the degree of vacuum on the chamber, manually controlled means for shifting said member, and means for retaining said control member in shifted position when the manually controlled means therefor is released.

8. A motor vehicle comprising in combination a vacuum controlled braking mechanism including braking means having a chamber in which a vacuum may be created, said chamber having a movable member for operating the braking means, a valve mechanism interposed between the chamber and a vacuum creating means, said valve mechanism including a shiftable member providing means for determining the degree of vacuum on the chamber, manually controlled means for shifting said member, means for retaining said control member in shifted position when the manually controlled means therefor is released, a power transmitting mechanism including means for applying and releasing a driving clutch, and means operated automatically upon the applying of the clutch for the shifting of the control member to release the braking means.

9. A motor vehicle comprising in combination a vacuum controlled braking mechanism including braking means having a chamber in which a vacuum may be created, said chamber having a movable member for operating the braking means, a vacuum creating means, a manually controlled valve mechanism interposed between the chamber and the vacuum creating means, said valve mechanism including a main rotatable control disk provided with means for determining the degree of vacuum on the chamber according to the setting of the control disk and for maintaining said vacuum constant for each setting of said disk, an auxiliary control disk in said valve mechanism provided with means for independently determining the degree of vacuum on the chamber and maintaining said vacuum constant at a fixed setting of said auxiliary control disk, and manually controlled means for operating each control disk.

10. A motor vehicle comprising in combination a vacuum controlled braking mechanism including braking means having a chamber in which a vacuum may be created, said chamber having a movable member for operating the braking means, a vacuum creating means, a manually controlled valve mechanism interposed between the chamber and the vacuum creating means, said valve mechanism including a main rotatable control disk provided with means for determining the degree of vacuum on the chamber according to the setting of the control disk and for maintaining said vacuum constant for each setting of said disk, an auxiliary control disk in said valve mechanism provided with means for independently determining the degree of vacuum on the chamber and maintaining said vacuum constant at a fixed setting of said auxiliary control disk, a power transmission mechanism including means for applying and releasing a driving clutch, and means operated automatically upon the applying of the clutch for shifting the auxiliary control disk to its initial position for releasing the braking means.

11. A motor vehicle comprising in combination a vacuum controlled braking mechanism including braking means having a chamber in which a vacuum may be created, said chamber having a movable member for operating the braking means, a manually controlled valve mechanism interposed between the chamber and the vacuum creating means, said valve mechanism including a main shiftable control member provided with means whereby the degree of vacuum produced on said chamber may be varied by shifting said control member, an auxiliary control member shiftable independently of the main control member and provided with means for determining and maintaining a predetermined degree of vacuum on the chamber, and independent manually controlled means for each control member.

12. A motor vehicle comprising in combination a vacuum controlled braking mechanism including braking means having a chamber in which a vacuum may be created, said chamber having a movable member for operating the braking means, a manually controlled valve mechanism interposed between the chamber and the vacuum creating means, said valve mechanism including a main shiftable control member provided with means whereby the degree of vacuum produced on said chamber may be varied by shifting said control member, an auxiliary control member shiftable independently of the main control member and provided with means for determining and maintaining a predetermined degree of vacuum on the chamber, and independent manually controlled means for each control member, said valve mechanism having means for retaining said auxiliary member in a shifted position with a vacuum on the chamber when the manually controlled means therefor is released.

13. A motor vehicle comprising in combination a vacuum controlled braking mechanism including braking means having a chamber in which a vacuum may be created, said chamber having a movable member for operating the braking means, a manually controlled valve mechanism interposed between the chamber and the vacuum creating means, said valve mechanism including a main shiftable control member provided with means whereby the degree of vacuum produced on said chamber may be varied by shifting said control member, an auxiliary control member shiftable independently of the main control member and provided with means for determining and maintaining a predetermined degree of vacuum on the chamber, and independent manually controlled means for each control member, said valve mechanism having means for retaining said auxiliary member in a shifted position with a vacuum on the chamber when the manually controlled means therefor is released, and means operated by the manually controlled means for the main control member for shifting said auxiliary member to normal position when said manually controlled means is operated for shifting the main control member for applying the braking means.

FREDERICK L. SHELOR.